Aug. 11, 1931.  E. F. JOHNSON  1,818,332
THIMBLE MAKING MACHINE
Filed April 27, 1928  7 Sheets-Sheet 2

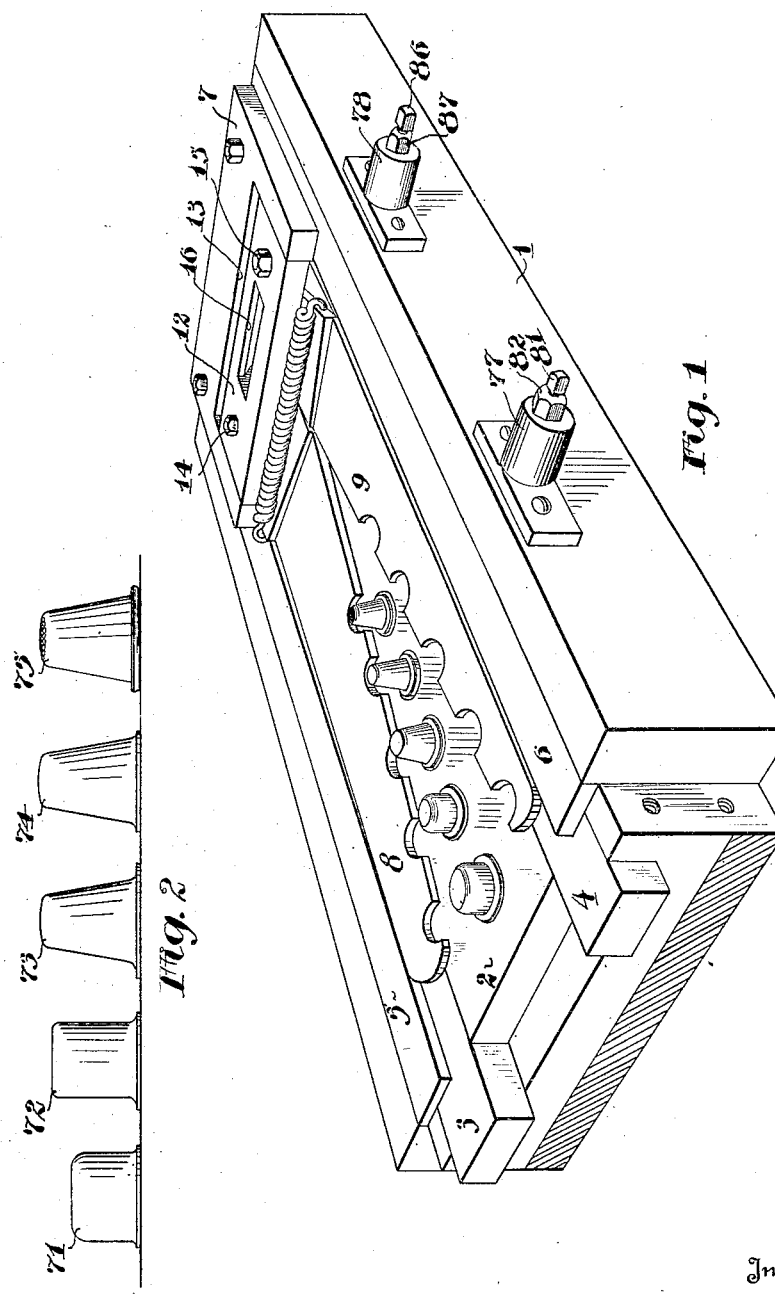

Inventor
Edwin F. Johnson
By
Attorney

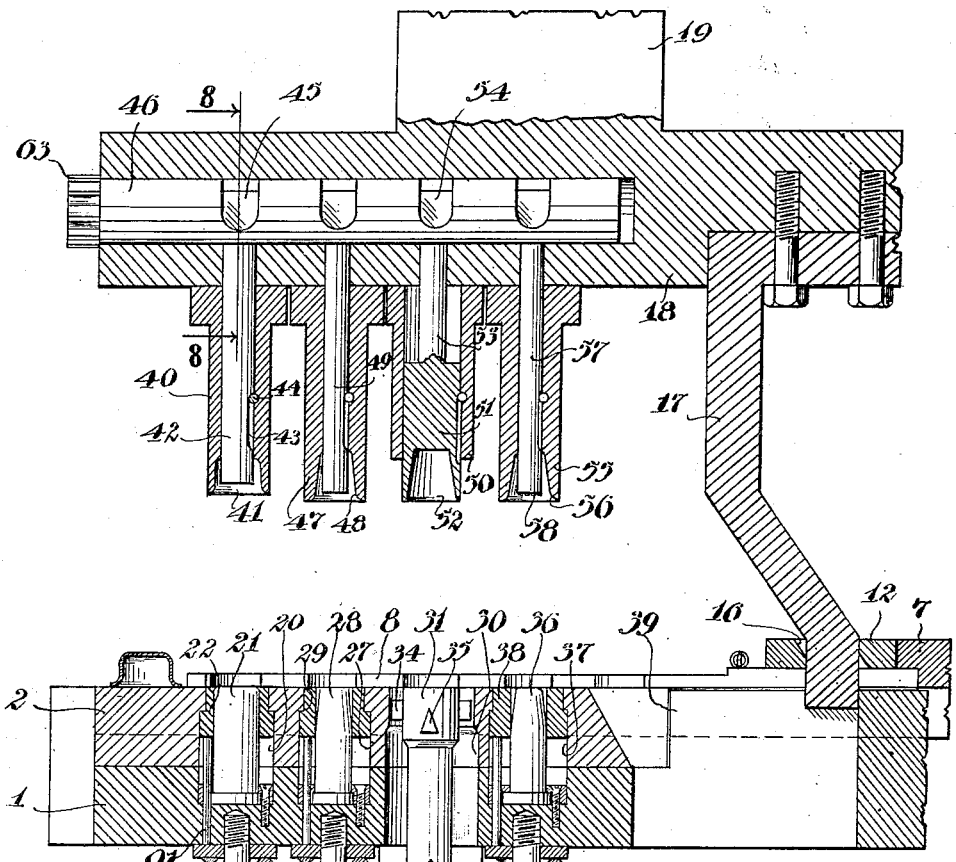
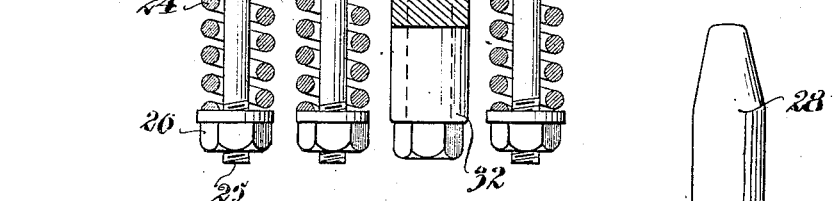
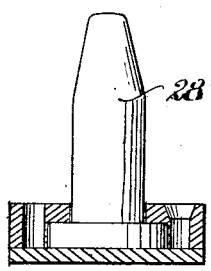
Fig. 7
Fig. 8  Fig. 9  Fig. 10
Inventor,
Edwin F. Johnson
Attorney Patented Aug. 11, 1931

1,818,332

UNITED STATES PATENT OFFICE

EDWIN F. JOHNSON, OF ST. PAUL, MINNESOTA

THIMBLE MAKING MACHINE

Application filed April 27, 1928. Serial No. 273,341.

The present invention relates to a thimble making machine.

In the manufacture of thimbles, certain manufacturing problems are encountered which are peculiar to this art, and it is the object of the present invention to make a mechanism for froming thimbles whereby blanks for the making of thimbles will be successively passed from one manufacturing stage to the other, with a minimum of delay and effort and by means of a mechanism simple and positive in its operation.

In order to attain this object, there is provided, in accordance with one feature of the invention, a plurality of dies and associated mechanism by means of which the successive operations of thimble manufacture may be carried on simultaneously and the blanks advanced by means of mechanisms associated with the dies from one manufacturing stage to the next.

These and other features of the invention will be more fully brought out in the following description and the accompanying drawings, wherein:

Figure 1 is a view in perspective of a die block and associated mechanism.

Figure 2 is a view in side elevation of a plurality of blanks in successive stages of manufacture.

Figure 7 is a sectional view on the line 7—7 of Figure 6.

Figure 8 is a sectional view on the line 8—8 of Figure 7.

Figure 9 is a view in top elevation of a male forming die.

Figure 10, is a sectional view on the line 10—10 of Figure 9; and

Figure 3:
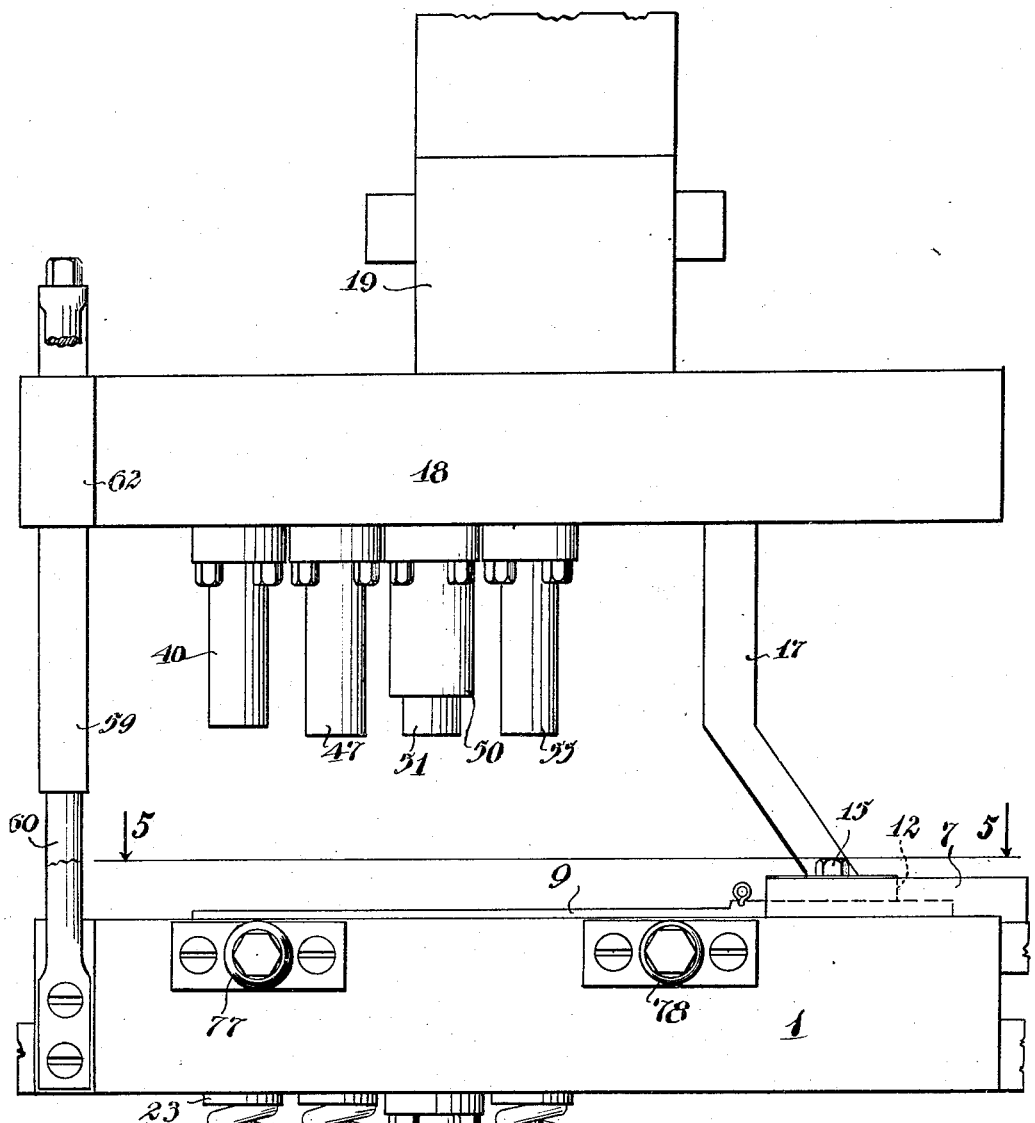
Figure 3 is a view in side elevation of the die mechanism showing the upper die in raised position.

Referring to the drawings in detail, a base block 1 is constructed of steel for mounting upon the bed of a punch press. A die block 2 is mounted on the upper surface thereof and is securely connected thereto. A pair of longitudinal slide members 3 and 4 are mounted to slide longitudinally of the base member, being held in position by plates 5 and 6 bolted to the sides of said base member. A plate 7 is securely bolted to the ends of the longitudinally slidable members 3 and 4 and a pair of feeding jaws 8 and 9 are pivotally connected as at 10 and 11 to the longitudinally slidable members 3 and 4. A loose plate 12 is mounted in a recess 13 in the forward end of the plate 7 to slide freely therein and is pivotally connected to the jaws 8 and 9, as by means of pivots 14 and 15. A cam opening 16 is formed in the slidable plate 12 to receive a sloping cam member 17 which is securely connected to the body 18 of an upper die member (see Figure 7) which is mounted on the plunger of a punch press (not shown) by means of a shaft 19. A pair of braking members 77 and 78 are provided on each side of the base block 1 to ride against the sides of the slide members 8 and 9. The member 77 has a plunger 79 mounted therein with a coil spring 80 held in compression between the end of the plunger and a regulating screw 81. A lock nut 82 is threadedly mounted on the screw 81 to hold it in adjusted position. The end of the plunger is beveled to fit a pair of recesses 88 and 83 in the side of the slide members to hold the slides against displacement during the opening and closing of the folding jaws 8 and 9. The brake mechanisms 78 comprise a brake shoe 84 held against the side of the slides 3 and 4 with a compression coil spring 85 and adjusting screw 86 held in adjusted position by a lock nut 87.

Four openings are provided in the lower die member which will be described in detail beginning at the forward opening 20. Centrally mounted within this opening is a male forming member 21 having an annular stripping member 22 mounted in the recess to surround the male forming member 21. Pins 91, of which there are preferably three provided, pass through openings in the base block 1 to slide freely therein, the lower ends of said pins resting upon an annular washer 23 beneath which a coil spring 24 is held in compression by means of a stud bolt 25. The tension of the spring may be regulated by means of a nut 26 threadedly mounted on the lower end of the stud bolt 25. In the second opening 27 a tapered male forming die 28 is mounted in a similar manner to that described for the forming member 21, said forming die having an annular stripping member 29 mounted in the same way as that just described for the stripping member 22. In the third opening 30 is mounted a female trimming die 31 supported upon a yoke 32 which is beveled as at 33 to pass the trimmings cut from the edge of the thimble blank. Cutting blades 34 and 35 extend outwardly from the sides of the female trimming die 31 to cut up the annular rings of material trimmed from the blanks by this operation so as to permit them to drop through the die. A third male forming die 36 is mounted in the fourth opening 37 and is provided with a stripping member 38 mounted in the same manner as that described for the first and second male forming dies. A large opening 39 is provided in the rearward part of the die through which the completely formed thimble blanks are dropped upon the completion of the four stages of manufacture.

Connected to the lower face of the upper die block are four die elements which will be described in detail. The first element comprises a die member 40 having a recess 41 in the bottom thereof to co-operate with the male forming element 21 immediately beneath it to perform the first drawing operation upon the thimble blank. A stripping plunger 42 is mounted therein and is provided with a recess 43 in the side thereof. A pin 44 is mounted transversely of the member 40 to ride in the recess 43 to limit the movement of the plunger 42. The upper end of the plunger 42 rides upon a cam surface 45 in a shaft 46 which, upon rotation of the shaft 46, forces the plunger downward to strip a blank from the cavity 41. The second die element 47 is formed with a cavity 48 and stripping plunger 49 to co-operate with the male forming member 28 to perform the second drawing operation upon the thimble. The third element comprises a trimming die 50 having a central portion 51 with a cavity 52 therein of a size to freely receive the thimble blank formed by the previous stages of manufacture. This central portion is slidably mounted within the cylindrical trimming die 50. The internal diameter of the trimming die 50 is of a size to closely receive the female die element 31 mounted in the lower block therein. The recessed central member 51 is provided with a shaft 53 which extends upwardly and rides upon a cam surface 54 upon the shaft 46. The fourth die element 55 is provided with a recess 56 in the lower end thereof similar to that provided in the elements 40 and 47 and the lower end of the plunger 57 in this element is provided with a plurality of small projections 58 which indent the top of the thimble blank in the manner customary in thimble manufacture, to hold the end of a needle (not shown) against slippage while using.

Figure 6:
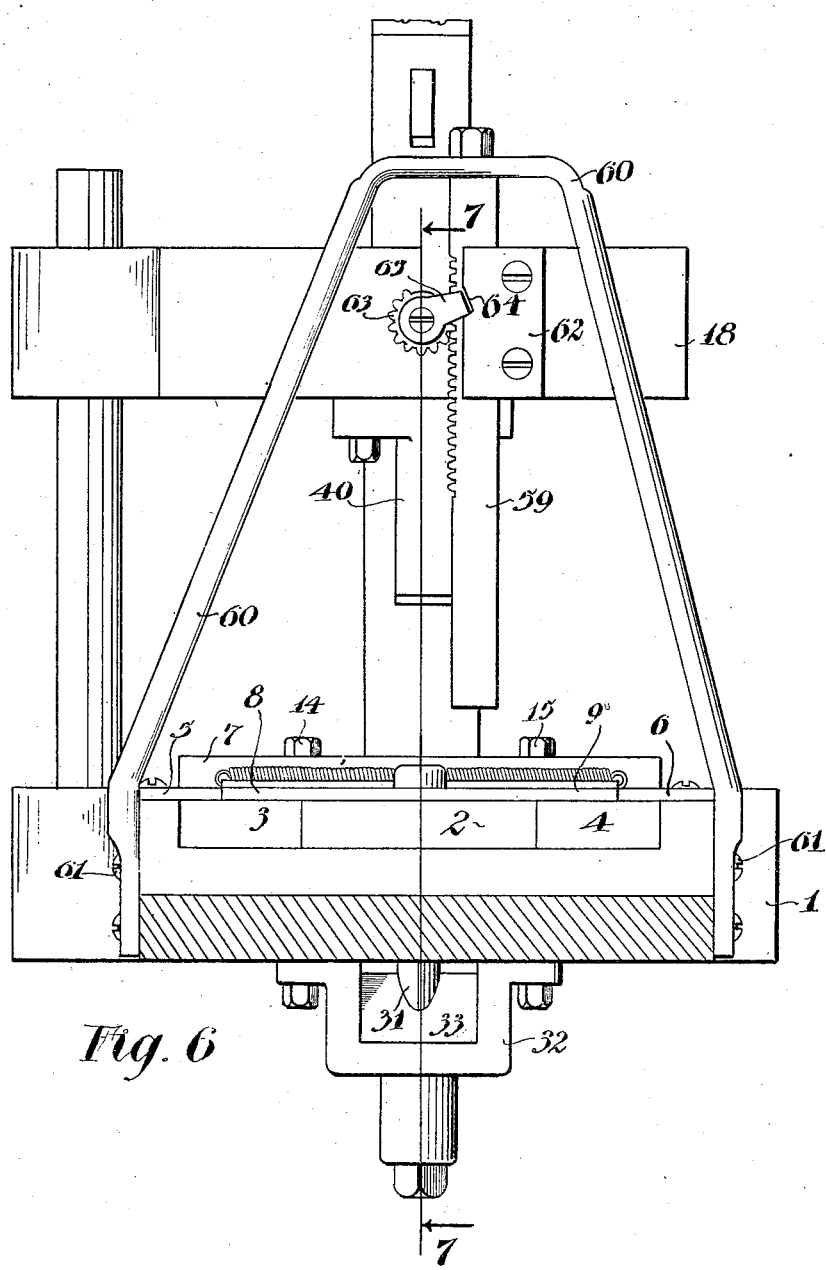
Figure 6 is a sectional view on the line 6—6 of Figure 4.

The cam shaft 46 is operated by a rack and pinion mechanism, best shown in Figure 6, the conformation of the cams being illustrated in Figure 8. In Figure 6 the upper die is shown in a raised position. A vertical rack 59 is mounted upon a yoke 60 secured to the base block 1 by means of screws 61. A guide block 62 is mounted to hold the rack 59 in position against a pinion 63 keyed to the camshaft 46. The face of the guide block 62 is notched as at 64 to receive an arm 65 secured to the end of the camshaft to rotate therewith. This arm is provided to give an initial torque to the cam shaft without unduly straining the pinion 63 in freeing the blanks from the dies.

A feeding mechanism for feeding the blanks with which the machine is supplied comprises a rotating disk 66 which is mounted upon a spindle, not shown, and rotated by suitable mechanism such as a small electric motor, not shown. Mounted above the disk and spaced therefrom a short distance is a plate 67 having a curved guideway 68 therein in which the thimble blanks are inserted and fed therethrough by the rotating disk upon which the bottom flanges of the blanks rest. A pair of jaws 68 and 69 are pivotally mounted across the outer end of the guideway and are held in closed position as by means of a small coil spring 70.

Figure 4:
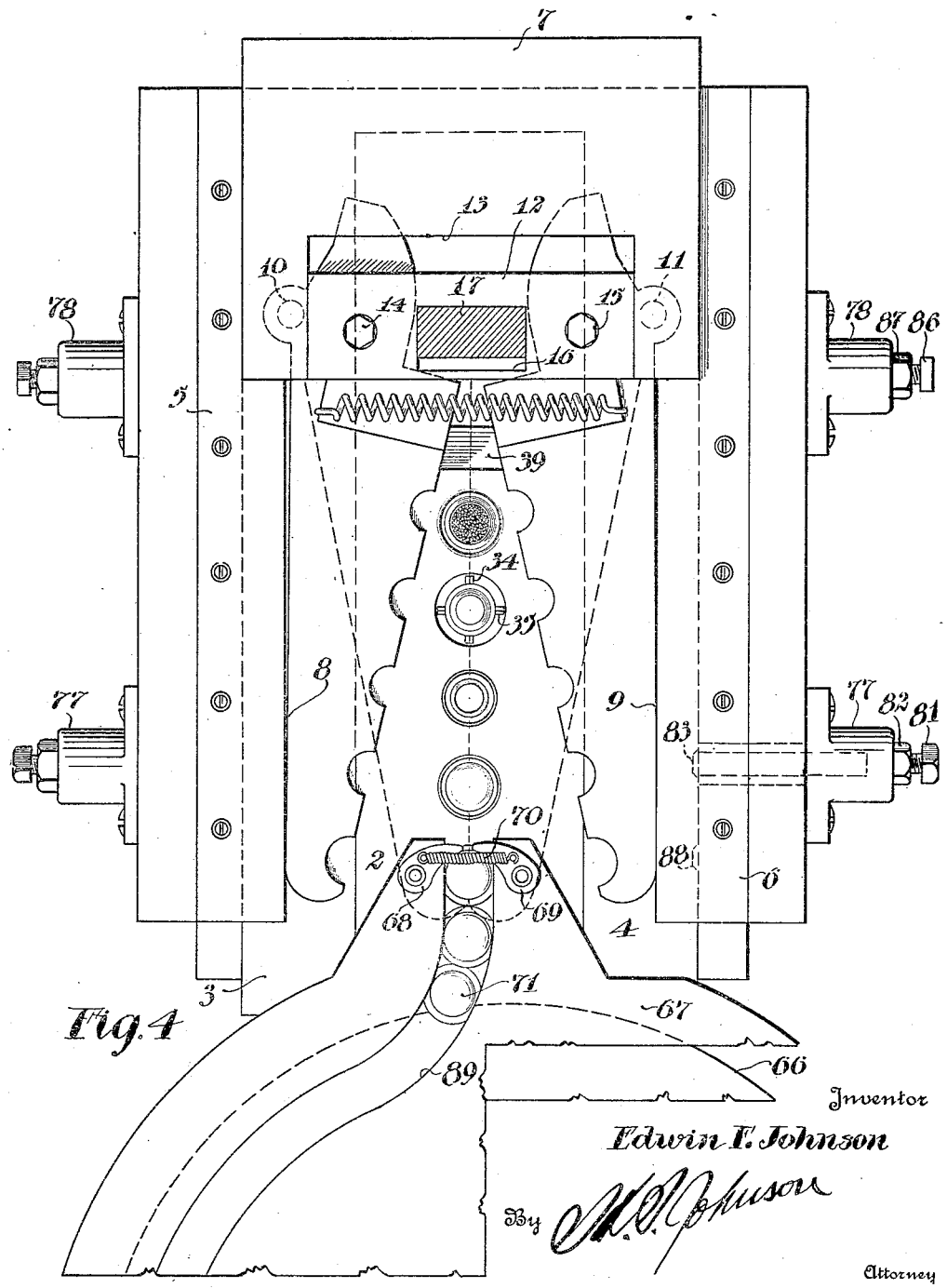
Figure 4 is a view on the line 4—4 of Figure 1, a pair of jaws for advancing the thimble blanks from one stage to the next being shown in open advanced position in solid lines, and in closed advanced position in dotted lines.
Figure 5:
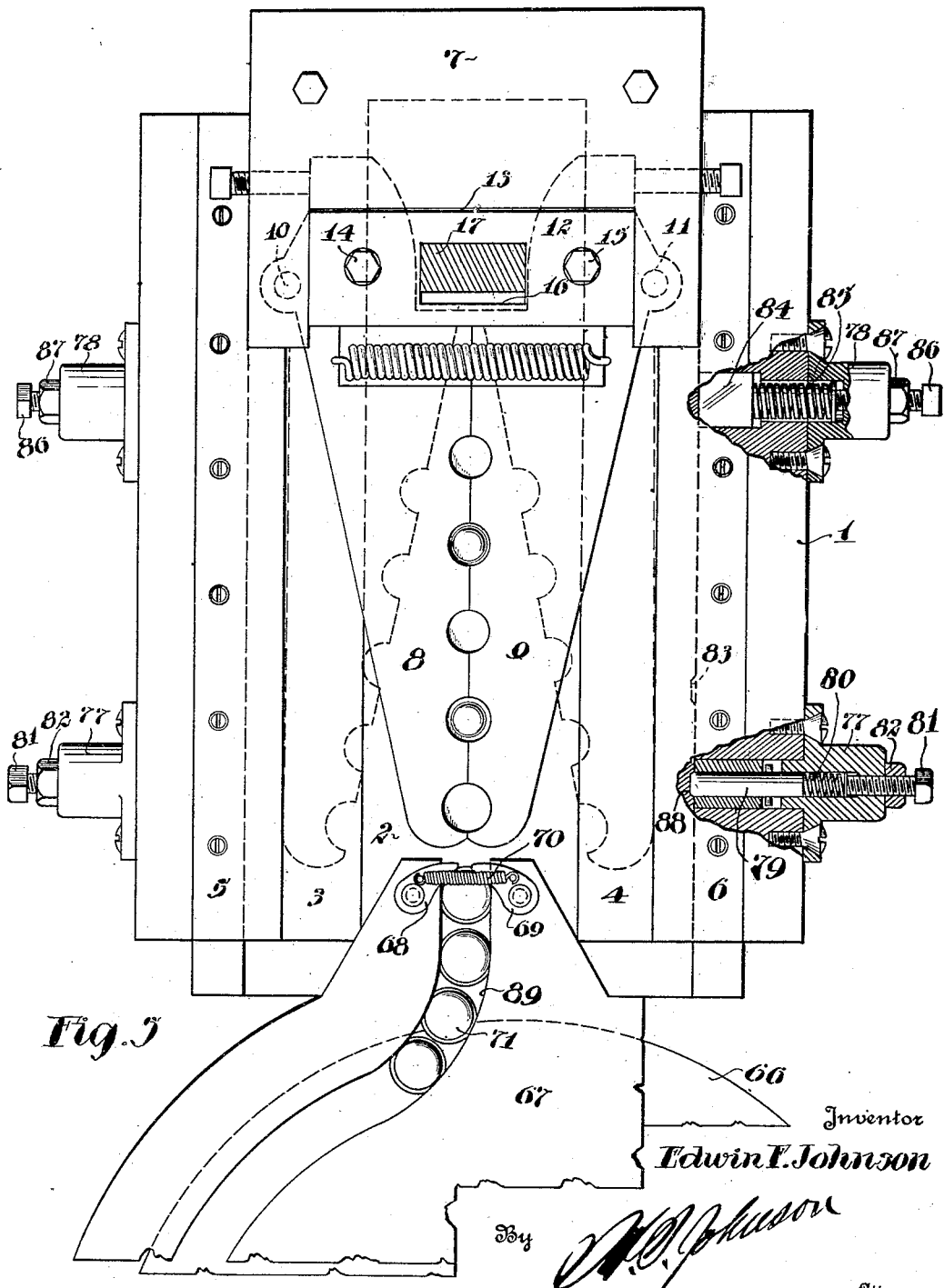
Figure 5 is a view similar to Figure 3, showing the jaws in closed normal position in solid lines, and in open normal position in dotted lines.
Figure 11:
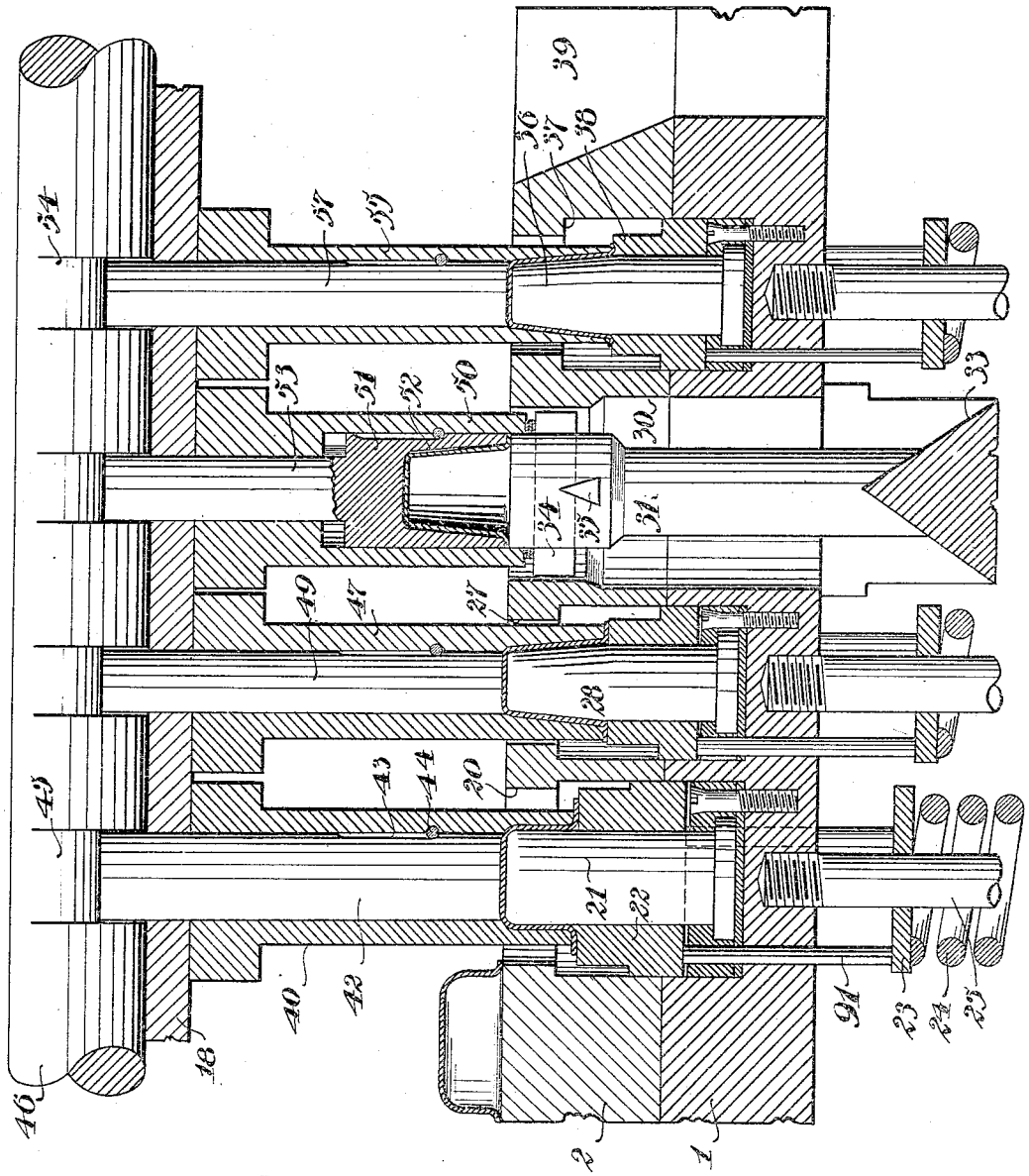
Figure 11 is an enlarged view of the die portion of the mechanism shown in Figure 7, the die being shown in closed position.

The operation of the device is as follows:

A supply of blanks 71 are inserted in the guideway 89 by suitable feeding mechanism or manually, as desired, and are moved by the rotating disk so that the outer blank rests against the spring held jaws 68 and 69. Considering that the upper die is in a raised position, as shown in Figures 3, 6, and 7, the press is operated to force the upper die downwardly to the position shown in Figure 11 and returned to the raised position. As the upper die commences its downward stroke, the cam member 17, operating in the cam opening 16 in the movable plate 12, moves the plate 12 forwardly, pivoting the feeding jaws 8 and 9 about the pivots 10 and 11, forcing the entire mechanism mounted upon the slidable bars 3 and 4 forwardly to the position shown in solid lines in Figure 4. As the upper die completes its downward stroke and starts on the upward stroke, the cam 17 forces the movable plate 12 rearwardly with respect to the plate 7 in which it is mounted, closing the jaws to the dotted line position shown in Figure 4, seizing a blank from between the spring-held jaws 68 and 69 and advancing it to a position over the first male die member 21 as the jaws move backwardly to the solid line position shown in Figure 5. Upon the second downward stroke of the press the feeding jaws are again advanced to the solid line position shown in Figure 4 and the blank in position over the first male die member 21 is forced downwardly and drawn to the shape shown in Figure 11. Upon the downward stroke of the press the cam shaft 46 is rotated by means of the pinion 63 and the rack 59 to permit the stripping plunger 42 to be forced upwardly, upon engaging the blank, to the position shown in Figure 11. As the upper die is raised again the pinion 63 is rotated by means of the rack 59 to force the stripping plunger 42 downwardly, stripping the blank from the die. At the same time the stripper 22 in the lower die is forced upwardly by the spring 24 and pins 22 to strip the blank from the male die member 21. Simultaneously, the jaws 8 and 9 close to the dotted line position shown in Figure 4, advancing the blank from the first stage to the second stage and at the same time seizing a fresh blank from between the spring-held jaws 68 and 69 and moving it into position over the first male die member. Upon the next downward stroke of the upper die member the blank in position over the second male die member is drawn to the form shown in Figure 11, and simultaneously, the fresh blank over the first male die member is drawn to the shape illustrated in the same manner as previously described for the first blank. Upon the next upward stroke of the die each of the blanks are advanced one step as previously described, the second blank being moved in position over the female trimming die 31. Upon the next downward stroke of the upper die member the inner recessed portion 51 of the third die member receives the blank within the recess in the bottom thereof, and the outer die member 50 is forced downwardly over the female die member 31, trimming the edge of the blank, as shown. The annular trimmings rest upon the knives 34 and 35 and, as successive annular rings are cut from the blanks, the metal is forced downwardly over these knives, cutting them up so that they will pass through the die, being deflected outwardly by the sloping surfaces 33. Upon the next upward stroke of the die, the blanks are all advanced one step, and in the following downward stroke the blank in the fourth stage of operation is drawn to the shape illustrated and the top thereof is indented by the small projections 58 on the lower end of the fourth stripping plunger 57. As the blanks are all advanced one step upon the next upward stroke of the die, the completed blank is moved over the opening 39 in the base and dropped through into a suitable receptacle, not shown, placed to receive the completed blanks.

The blanks in successive stages of manufacture are shown in Figure 2, 71 representing the blank as it is fed to the machine, 72 after the first stage of manufacture, 73 the second, 74 the third, and 75 the fourth.

I claim:

1. A thimble forming mechanism comprising a stationary die support, a movable die support, a pair of spaced guide members slidably mounted on said stationary die support, a pair of pivoted cooperating jaws carried by said guide members, a downwardly and rearwardly inclined arm carried by said movable die support and engaging the guide members and jaws to open and close the latter for successively feeding blanks between said die supports, and means for feeding blanks to said jaws.

2. In a press having a plurality of spaced, aligned die members, feed means adapted to advance blanks successively from one manufacturing stage to the next, comprising a pair of slidable supports, means mounted to resist slidable movement between one of said supports and the press body, a pair of feed jaws pivotally mounted on one of said slidable members and having eccentric pivotal engagement with the other of said slidable members, and cam means acting on one of said slidable members to alternately open and advance said jaws and to close and retract said jaws.

3. In a press, a plurality of spaced, aligned die members, comprising a plurality of forming dies adapted to draw and form a cup-shaped blank, a trimming die comprising a female trimming die, a stripping plunger mounted therein and having a recess in an end thereof to receive said blank, a male trimming die mounted to enter said female trimming die and having a plurality of radial knives mounted thereon to sever said trimmings, said trimmings being forced downwardly over said knives by said female die, and feed means adapted to seize a blank from each die member and advance it to the next successive die member.

4. In a press having a plurality of spaced, aligned die members, a slidable support member adapted to slide longitudinally of the line of alinement of said die members, frictional means mounted to resist the slidable movement of said support member, a pair of feed jaws having a plurality of notches in each spaced to correspond with said die members, a member mounted to slide loosely with respect to said slidable support member, said jaws having eccentric pivotal connection therewith to be opened by a movement of said slidable plate with respect to said support in one direction and to be closed by a slidable movement of said plate with respect to said support in the opposite direction, and an actuating member having operative connection with said die members to actuate said slidable plate in said support on an operative movement of said die members.

In testimony whereof I affix my signature.
EDWIN F. JOHNSON.